United States Patent
Sekiba

(10) Patent No.: US 7,396,872 B2
(45) Date of Patent: Jul. 8, 2008

(54) GREASY SILICONE COMPOSITION

(75) Inventor: Kazuhiro Sekiba, Kanagawa Prefecture (JP)

(73) Assignee: Dow Corning Toray Silicone Co., Tokyo (JP)

( * ) Notice: Subject to any disclaimer, the term of this patent is extended or adjusted under 35 U.S.C. 154(b) by 178 days.

(21) Appl. No.: 10/469,490

(22) PCT Filed: Mar. 11, 2002

(86) PCT No.: PCT/JP02/02239

§ 371 (c)(1),
(2), (4) Date: Aug. 29, 2003

(87) PCT Pub. No.: WO02/072702

PCT Pub. Date: Sep. 19, 2002

(65) Prior Publication Data

US 2004/0097628 A1    May 20, 2004

(30) Foreign Application Priority Data

Mar. 9, 2001 (JP) .............................. 2001-065860
Mar. 15, 2001 (JP) .............................. 2001-074744

(51) Int. Cl.
    *C08L 83/04* (2006.01)
(52) U.S. Cl. ...................... 524/588; 524/430; 524/432; 524/493
(58) Field of Classification Search ................. 524/588, 524/430, 432, 493
    See application file for complete search history.

(56) References Cited

U.S. PATENT DOCUMENTS 5,798,171 A * 8/1998 Olson .......................... 428/220
6,294,592 B1 * 9/2001 Herrmann et al. .............. 522/75

FOREIGN PATENT DOCUMENTS

| EP | 823 451 | * | 2/1998 |
|----|---------|---|--------|
| EP | 896 031 | * | 2/1999 |
| JP | 50-66552 |   | 6/1975 |
| JP | 50-105573 |  | 8/1975 |
| JP | 51-55870 |   | 5/1976 |
| JP | 59-157192 |  | 9/1984 |
| JP | 60-20997 |   | 2/1985 |
| JP | 60-106890 |  | 6/1985 |
| JP | 61-157587 |  | 7/1986 |
| JP | 62-43492 |   | 2/1987 |
| JP | 02-153995 |  | 6/1990 |
| JP | 03-162493 |  | 7/1991 |
| JP | 10-110179 |  | 4/1998 |
| JP | 11-49958 |   | 2/1999 |
| WO | 99/01517 | * | 1/1999 |

* cited by examiner

Primary Examiner—Kuo-Liang Peng
(74) Attorney, Agent, or Firm—Howard & Howard Attorneys, P.C.

(57) ABSTRACT

A grease-like silicone composition comprising at least a liquid organopolysiloxane comprising siloxane units represented by the formula $R_2SiO_{2/2}$, siloxane units represented by the formula $RSiO_{3/2}$, and siloxane units represented by the formula $R_3SiO_{1/2}$ and a thickening agent. A grease-like silicone composition is provided that is capable of containing a large amount of thickening agent and possesses superior heat resistance.

18 Claims, No Drawings

GREASY SILICONE COMPOSITION

The present invention relates to a grease-like silicone composition, and, in particular, to a grease-like silicone composition capable of containing a large amount of thickening agent and possessing superior heat resistance.

BACKGROUND TECHNOLOGY

Grease-like silicone compositions comprising liquid organopolysiloxane and thickening agents, such as zinc oxide powders, aluminum powders, etc., have been offered, for example, in Japanese Unexamined Patent Application Publication No. Sho 50-105573, Japanese Unexamined Patent Application Publication No. Sho 51-55870, and Japanese Unexamined Patent Application Publication No. Sho 61-157587. However, the problem with these compositions is that they cease to display grease-like characteristics when they contain a large amount of thickening agent, and allowing them to stand at high temperatures leads to a noticeable drop in their penetration and leads to hardening.

It is an object of the present invention to provide a grease-like silicone composition capable of containing a large amount of thickening agent and possessing superior heat resistance.

DISCLOSURE OF INVENTION

The grease-like silicone composition of the present invention comprises (A) a liquid organopolysiloxane comprising 80 to 96.5 mol % of siloxane units represented by the formula $R_2SiO_{2/2}$, 1.0 to 10.0 mol % of siloxane units represented by the formula $RSiO_{3/2}$, and 0.25 to 10.0 mol % of siloxane units represented by the formula $R_3SiO_{1/2}$ wherein each R is selected from monovalent hydrocarbon groups, and (B) a thermally conductive powder.

PREFERRED MODES OF WORKING THE INVENTION

Component (A), which is the main ingredient of the present composition, is a branched or partially branched linear liquid organopolysiloxane comprising siloxane units represented by the formula $R_2SiO_{2/2}$, siloxane units represented by the formula $RSiO_{3/2}$, and siloxane units represented by the formula $R_3SiO_{1/2}$. In the formulas, R stands for identical or different monovalent hydrocarbon groups, which are exemplified, for instance, by groups such as methyl, ethyl, propyl, butyl, pentyl, hexyl, octyl, decyl, dodecyl, tetradecyl, hexadecyl, octadecyl, and other alkyl groups; cyclopentyl, cyclohexyl, and other cycloalkyl groups; vinyl, allyl, butenyl, pentenyl, hexenyl, and other alkenyl groups; phenyl, naphthyl, tolyl, xylyl, and other aryl groups; benzyl, phenethyl, and other aralkyl groups; and by chloromethyl, 3-chloropropyl, 3,3,3-trifluoropropyl, and other halogenated alkyl groups, with alkyl, alkenyl, and aryl groups being preferable, and methyl, ethyl, vinyl, and phenyl being especially preferable.

The liquid organopolysiloxane is characterized in that the content of the siloxane units represented by the formula $R_2SiO_{2/2}$ is within the range of from 80 to 96.5 mol %, the content of the siloxane units represented by the formula $RSiO_{3/2}$ is within the range of from 1.0 to 10.0 mol %, and the content of the siloxane units represented by the formula $R_3SiO_{1/2}$ is within the range of from 0.25 to 10.0 mol %. This is due to the fact that liquid organopolysiloxane, in which the content of the siloxane units represented by the formula $RSiO_{3/2}$ is below the lower limit of the above-mentioned range, has a low degree of branching and cannot contain a large amount of component (B), and the heat resistance of the resultant grease-like silicone composition tends to decrease. On the other hand, liquid organopolysiloxane, in which it exceeds the upper limit of the above-mentioned range, has a high degree of branching and the resultant grease-like silicone composition tends to exhibit a noticeable decrease in handleability and flowability.

Although there are no limitations on the viscosity of such a liquid organopolysiloxane, preferably, its viscosity at 25° C. is within the range of from 10 to 100,000 mPa·s, and even more preferably, within the range of from 100 to 100,000 mPa·s. This is due to the fact that when the viscosity of the liquid organopolysiloxane is below the lower limit of the above-mentioned range, the organopolysiloxane tends to evaporate easily, and, on the other hand, when it exceeds the upper limit of the above-mentioned range, the resultant grease-like silicone composition tends to exhibit a noticeable decrease in handleability and flowability.

There are no limitations on the method of preparation used to make the liquid organopolysiloxane. For example, it is suggested to use a method, in which an organopolysiloxane containing siloxane units represented by the formula $RSiO_{3/2}$, siloxane units represented by the formula $R_2SiO_{2/2}$, and siloxane units represented by the formula $R_3SiO_{1/2}$, which is obtained via the co-hydrolysis and condensation of organohalosilanes represented by the formulas $RSiCl_3$, $R_2SiCl_2$, and $R_3SiCl$, etc., is subjected to an equilibration reaction with a diorganopolysiloxane represented by the general formula $R_3SiO(R_2SiO)_mSiR_3$ and/or a cyclic diorganopolysiloxane represented by the general formula $(R_2SiO)_n$ in the presence of an equilibration reaction catalyst such as potassium hydroxide, potassium silanolate compounds, etc., whereupon the product is neutralized with carbon dioxide, phosphoric acid or other acids, or halosilanes such as $R_2SiCl_2$, $R_3SiCl$, etc. In the formulas above, R stands for identical or different monovalent hydrocarbon groups exemplified by the same groups as those mentioned above.

Component (B) is a thickening agent used to impart the present composition with grease-like characteristics. Although there are no limitations on the particle size of the thickening agent, its average particle size is preferably within the range of from 0.1 to 100 μm. This is due to the fact that when the average particle size is less than the lower limit of the above-mentioned range, the action of the thickening agent is no longer sufficiently effective, and, on the other hand, when it exceeds the upper limit of the above-mentioned range, it becomes difficult to uniformly disperse it in component (A). There are no limitations on the shape of the thickening agent, which is exemplified by spherical, multi-faceted, needle-like, and irregular shapes. The thickening agent may be a combination of two or more differently shaped agents, such as, for instance, a combination of a spherical agent and an irregularly shaped agent.

Alumina, silicon carbide, aluminum nitride, boron nitride, quartz powder, and other thermally conductive powders are examples of thickening agents useful in this invention. The thickening agents may be a combination of two or more of the above-mentioned powders.

Although there are no limitations on the content of component (B) in the present composition, preferably, it is within the range of from 10 to 2,000 parts by weight, or, more preferably, within the range of from 10 to 1,500 parts by weight, and, especially preferably, within the range of from 10 to 1,000 parts by weight, per 100 parts by weight of component (A). This is due to the fact that when the content of component (B) is less than the lower limit of the above-mentioned ranges, the resultant composition no longer displays its grease-like characteristics, and, on the other hand, when it exceeds the upper limit of the above-mentioned ranges, the resultant composition exhibits a decrease in handleability and flowability and no longer exhibits grease-like characteristics.

As other optional components, the present composition may also contain methyltrimethoxysilane, n-hexyltrimethoxysilane, n-decyltrimethoxysilane, methyltrichlorosilane, hexamethyldisilazane, and other surface treating agents; and, in addition, pigments, dyes, fluorescent dyes, plasticizers, heat stabilizers, anti-ageing agents, fungicides, organic solvents, etc.

The present composition can be prepared by uniformly mixing component (A), component (B), and, if necessary, other optional components, in a kneader apparatus. A tri-mixer, a twin mixer, or a planetary mixer made by Inoue Manufacturing Co., Ltd., Ultramixer made by Mizuho Industrial Co., Ltd., and T.K. HIVIS DISPER MIX® made by Tokushu Kika Kogyo Co., Ltd., etc. are suggested as the kneaders. In addition, at such time, if necessary, the composition can be either cooled or heated. Furthermore, after preparing a grease-like silicone composition in the kneader apparatus, the composition may be kneaded in a 3-roll mill, colloid mill, sand grinder, etc. in order to render it more homogeneous.

The use of a branched or partially branched linear liquid organopolysiloxane as component (A) in the present composition makes it possible to suppress bleed out and avoid faulty electrical connections at electric contact points, problems with micro-motor rotation, and other troubles. Furthermore, since the composition does not harden even if it is exposed to high temperatures for an extended period of time, it is suitable for use as a grease for transistors, ICs, diodes, thermistors, etc.

APPLICATION EXAMPLES

The grease-like silicone composition of the present invention will be now explained by referring to application examples. The term "viscosity" used here refers to values obtained at 25° C., and the penetration of the grease-like silicone composition was determined in accordance with the method stipulated in JIS K 2220. In addition, the heat resistance of the grease-like silicone composition was evaluated based on the change in the penetration of the composition before and after a heat resistance test by measuring its penetration after allowing it to stand for 24 hours in an oven at 200° C.

Application Example 1

A grease-like silicone composition was prepared by putting 100 parts by weight of a liquid organopolysiloxane (1) with a viscosity of 800 mPa·s comprising 94.0 mol % of siloxane units represented by the formula $(CH_3)_2SiO_{2/2}$, 3.3 mol % of siloxane units represented by the formula $CH_3SiO_{3/2}$, and 2.7 mol % of siloxane units represented by the formula $(CH_3)_3SiO_{1/2}$ and 930 parts by weight of a spherical alumina powder with an average particle size of 11.5 μm in a planetary mixer, stirring the mixture, and then subjecting it to further agitation for 30 minutes at room temperature under reduced pressure.

Application Example 2

A grease-like silicone composition was prepared in the same manner as in Application Example 1 except for using 600 parts by weight of an irregular alumina powder with an average particle size of 2.5 μm instead of 930 parts by weight of the spherical alumina powder with an average particle size of 11.5 μm used in Application Example 1.

Application Example 3

A grease-like silicone composition was prepared in the same manner as in Application Example 1 except for using 350 parts by weight of a crushed quartz powder with an average particle size of 5.0 μm instead of 930 parts by weight of the spherical alumina powder with an average particle size of 11.5 μm used in Application Example 1.

Application Example 4

A grease-like silicone composition was prepared in the same manner as in Application Example 1 except for using 200 parts by weight of a zinc oxide powder with an average particle size of 0.6 μm instead of 930 parts by weight of the spherical alumina powder with an average particle size of 11.5 μm used in Application Example 1.

Application Example 5

A grease-like silicone composition was prepared in the same manner as in Application Example 1 except for using 500 parts by weight of a silicon carbide powder with an average particle size of 5.0 μm instead of 930 parts by weight of the spherical alumina powder with an average particle size of 11.5 μm used in Application Example 1.

Application Example 6

A grease-like silicone composition was prepared in the same manner as in Application Example 1 except for using 600 parts by weight of an aluminum carbide powder with an average particle size of 2.5 μm instead of 930 parts by weight of the spherical alumina powder with an average particle size of 11.5 μm used in Application Example 1.

Application Example 7

A grease-like silicone composition was prepared in the same manner as in Application Example 1 except for using a liquid organopolysiloxane with a viscosity of 600 mPa·s comprising 94.0 mol % of siloxane units represented by the formula $(CH_3)_2SiO_{2/2}$, 2.5 mol % of siloxane units represented by the formula $CH_3SiO_{3/2}$, and 3.5 mol % of siloxane units represented by the formula $(CH_3)_3SiO_{1/2}$ instead of liquid organopolysiloxane (I) used in Application Example 1.

Application Example 8

A grease-like silicone composition was prepared in the same manner as in Application Example 1 except for using a liquid organopolysiloxane with a viscosity of 800 mPa·s comprising 94.0 mol % of siloxane units represented by the formula $(CH_3)_2SiO_{2/2}$, 3.3 mol % of siloxane units represented by the formula $CH_3SiO_{3/2}$, 2.0 mol % of siloxane units represented by the formula $(CH_3)_3SiO_{1/2}$, and 0.7 mol % of siloxane units represented by the formula $(CH_3)_2(CH_2=CH)SiO_{1/2}$ instead of liquid organopolysiloxane (1) used in Application Example 1.

Comparative Example 1

Except for using a linear dimethylpolysiloxane with a viscosity of 110 mPa·s having both ends of the molecular chain blocked by trimethylsiloxy groups instead of liquid organopolysiloxane (I) used in Application Example 1, the procedure was the same as in Application Example 1, but a grease-like silicone composition could not be obtained.

Comparative Example 2

Except for using a linear dimethylpolysiloxane with a viscosity of 350 mPa·s having both ends of the molecular chain blocked by trimethylsiloxy groups instead of liquid organopolysiloxane (I) used in Application Example 1, the procedure was the same as in Application Example 1, but a grease-like silicone composition could not be obtained.

Comparative Example 3

Except for using a linear dimethylpolysiloxane with a viscosity of 1,000 mPa·s having both ends of the molecular chain blocked by trimethylsiloxy groups instead of liquid organopolysiloxane (I) used in Application Example 1, the procedure was the same as in Application Example 1, but a grease-like silicone composition could not be obtained.

Comparative Example 4

Except for using a linear dimethylpolysiloxane with a viscosity of 110 mPa·s having both ends of the molecular chain blocked by trimethylsiloxy groups instead of liquid organopolysiloxane (I) used in Application Example 2, the procedure was the same as in Application Example 2, but a grease-like silicone composition could not be obtained.

Comparative Example 5

Except for using a linear dimethylpolysiloxane with a viscosity of 1,000 mPa·s having both ends of the molecular chain blocked by trimethylsiloxy groups instead of liquid organopolysiloxane (I) used in Application Example 2, the procedure was the same as in Application Example 2, but a grease-like silicone composition could not be obtained.

Comparative Example 6

A grease-like silicone composition was prepared in the same manner as in Application Example 2 except for using a liquid organopolysiloxane with a viscosity of 900 mPa·s comprising 48.0 mol % of siloxane units represented by the formula $(CH_3)(C_{12}H_{25})SiO_{2/2}$, 48.0 mol % of siloxane units represented by the formula $(CH_3)(C_{14}H_{29})SiO_{2/2}$, and 4.0 mol % of siloxane units represented by the formula $(CH_3)_3SiO_{2/2}$ instead of liquid organopolysiloxane (I) used in Application Example 2.

Comparative Example 7

A grease-like silicone composition was prepared by putting 95 parts by weight of a linear dimethylpolysiloxane with a viscosity of 350 mPa·s having both ends of the molecular chain blocked by trimethylsiloxy groups, 600 parts by weight of a crushed quartz powder with an average particle size of 5.0 μm, and 5 parts by weight of n-decyltrimethoxysilane as a surface treating agent for the above-mentioned powder in a planetary mixer, stirring the mixture, and subjecting it to further agitation for 30 minutes at room temperature under reduced pressure.

Comparative Example 8

The procedure was the same as in Application Example 3 except for using a liquid organopolysiloxane with a viscosity of 950 mPa·s comprising 20.0 mol % of siloxane units represented by the formula $(CH_3)\{CH_2CH(CH_3)C_6H_5\}SiO_{2/2}$, 4.0 mol % of siloxane units represented by the formula $(CH_3)(C_{14}H_{29})SiO_{2/2}$, and 76.0 mol % of siloxane units represented by the formula $(CH_3)_3SiO_{1/2}$ instead of liquid organopolysiloxane (1) used in Application Example 3, but a grease-like silicone composition could be obtained.

Comparative Example 9

A grease-like silicone composition was prepared in the same manner as in Application Example 4 except for using a liquid organopolysiloxane with a viscosity of 950 mPa·s comprising 20.0 mol % of siloxane units represented by the formula $(CH_3)\{CH_2CH(CH_3)C_6H_5\}SiO_{2/2}$, 4.0 mol % of siloxane units represented by the formula $(CH_3)(C_{14}H_{29})SiO_{2/2}$, and 76.0 mol % of siloxane units represented by the formula $(CH_3)_3SiO_{1/2}$ instead of liquid organopolysiloxane (I) used in Application Example 4.

Comparative Example 10

A grease-like silicone composition was prepared in the same manner as in Application Example 5 except for using a liquid organopolysiloxane with a viscosity of 950 mPa·s comprising 20.0 mol % of siloxane units represented by the formula $(CH_3)\{CH_2CH(CH_3)C_6H_5\}SiO_{2/2}$, 4.0 mol % of siloxane units represented by the formula $(CH_3)(C_{14}H_{29})SiO_{2/2}$, and 76.0 mol % of siloxane units represented by the formula $(CH_3)_3SiO_{1/2}$ instead of liquid organopolysiloxane (1) used in Application Example 5.

Comparative Example 11

A grease-like silicone composition was prepared in the same manner as in Application Example 6 except for using a liquid organopolysiloxane with a viscosity of 950 mPa·s comprising 20.0 mol % of siloxane units represented by the formula $(CH_3)\{CH_2CH(CH_3)C_6H_5\}SiO_{2/2}$, 4.0 mol % of siloxane units represented by the formula $(CH_3)(C_{14}H_{29})SiO_{2/2}$ and 76.0 mol % of siloxane units represented by the formula $(CH_3)_3SiO_{1/2}$ instead of liquid organopolysiloxane (I) used in Application Example 6.

TABLE 1

| | | Examples | | | | | | | | | | | | |
|---|---|---|---|---|---|---|---|---|---|---|---|---|---|---|
| | | Application Examples | | | | | | | | Comparative Examples | | | | |
| Characteristics | | 1 | 2 | 3 | 4 | 5 | 6 | 7 | 8 | 6 | 7 | 9 | 10 | 11 |
| Penetration (mm/10) | Prior to heat resistance test | 350 | 330 | 340 | 210 | 415 | 275 | 400 | 360 | 440 | 310 | 440 | 395 | 460 |
| | After heat resistance test | 340 | 325 | 330 | 210 | 410 | 265 | 395 | 355 | — | — | — | — | — |
| Coefficient of thermal conductivity (W/mk) | | 3.1 | 2.3 | 1.9 | 0.7 | 3.0 | 2.4 | 3.1 | 3.1 | 2.3 | 2.2 | 0.7 | 3.0 | 2.3 |

In addition, in the table, the symbols "-" in the row containing the values of penetration after the heat resistance test mean that it was impossible to measure the penetration because the grease-like silicone composition had solidified during the heat resistance test.

POSSIBLE INDUSTRIAL USES

The grease-like silicone composition of the present invention is characterized by being capable of containing a large amount of thermally conductive powder and possessing superior heat resistance.

The invention claimed is:

1. A grease-like silicone composition comprising:
    (A) a liquid organopolysiloxane comprising:
        (i) 80 to 96.5 mol % of siloxane units represented by the formula $R_2SiO_{2/2}$;
        (ii) 1.0 to 10.0 mol % of siloxane units represented by the formula $RSiO_{3/2}$, and,
        (iii) 0.25 to 10.0 mol % of siloxane units represented by the formula $R_3SiO_{1/2}$, wherein each R is a monovalent hydrocarbon group, and
    (B) a thermally conductive powder present in an amount of from 200 to 2000 parts by weight per 100 parts by weight of component (A).

2. The grease-like silicone composition as claimed in claim 1, wherein the viscosity of component (A) at 25° C. is 10 to 100,000 mPa·s.

3. The grease-like silicone composition as claimed in claim 1, wherein the average particle size of component (B) is 0.1 to 100 μm.

4. The grease-like silicone composition as claimed in claim 1, wherein component (B) is comprised of at least one thermally conductive powder selected from group consisting of alumina powder, quartz powder, zinc oxide powder, silicon carbide powder, and aluminum nitride powder.

5. The grease-like silicone composition as claimed in claim 1, wherein component (B) is present in an amount of from 200 to 1,500 parts by weight per 100 parts by weight of component (A).

6. The grease-like silicone composition as claimed in claim 5, wherein component (B) is present in an amount of from 200 to 930 parts by weight per 100 parts by weight of component (A).

7. The grease-like silicone composition as claimed in claim 1, wherein component (B) comprises a combination of two differently shaped powders.

8. The grease-like silicone composition as claimed in claim 1 further comprising a surface treating agent.

9. The grease-like silicone composition as claimed in claim 8 wherein the surface treating agent is selected from the group of methyltrimethoxysilane, n-hexyltrimethoxysilane, n-decyltrimethoxysilane, methyltrichlorosilane, hexamethyldisilazane, and combinations thereof.

10. A method of preparing a grease-like silicone composition comprising the step of mixing:
    (A) a liquid organopolysiloxane comprising:
        (i) 80 to 96.5 mol % of siloxane units represented by the formula $R_2SiO_{2/2}$;
        (ii) 1.0 to 10.0 mol % of siloxane units represented by the formula $RSiO_{3/2}$, and,
        (iii) 0.25 to 10.0 mol % of siloxane units represented by the formula $R_3SiO_{1/2}$, wherein each R is a monovalent hydrocarbon group, and
    (B) a thermally conductive powder present in an amount of from 200 to 2000 parts by weight per 100 parts by weight of component (A).

11. The method as claimed in claim 10, wherein component (B) is present in an amount of from 200 to 1,500 parts by weight per 100 parts by weight of component (A).

12. The method as claimed in claim 11, wherein component (B) is present in an amount of from 200 to 930 parts by weight per 100 parts by weight of component (A).

13. The method as claimed in claim 10, wherein the viscosity of component (A) at 25° C. is 10 to 100,000 mPa·s.

14. The method as claimed in claim 10, wherein the average particle size of component (B) is 0.1 to 100 μm.

15. The method as claimed in claim 10, wherein component (B) is comprised of at least one thermally conductive powder selected from group consisting of alumina powder, quartz powder, zinc oxide powder, silicon carbide powder, and aluminum nitride powder.

16. The method as claimed in claim 10, wherein the component (B) comprises a combination of two differently shaped powders.

17. The method as claimed in claim 10 further comprising the step of mixing a surface treating agent and at least one of (A) or (B).

18. The method as claimed in claim 17 wherein the surface treating agent is selected from the group of methyltrimethoxysilane, n-hexyltrimethoxysilane, n-decyltrimethoxysilane, methyltrichlorosilane, hexamethyldisilazane, and combinations thereof.

* * * * *

UNITED STATES PATENT AND TRADEMARK OFFICE
CERTIFICATE OF CORRECTION

| | | |
|---|---|---|
| PATENT NO. | : 7,396,872 B2 | Page 1 of 1 |
| APPLICATION NO. | : 10/469490 | |
| DATED | : July 8, 2008 | |
| INVENTOR(S) | : Kazuhiro Sekiba | |

It is certified that error appears in the above-identified patent and that said Letters Patent is hereby corrected as shown below:

Column 7, line 40, after "at 25°" delete "C." and insert therein -- C --.

Column 8, line 41, after "at 25°" delete "C." and insert therein -- C --.

Signed and Sealed this

Twenty-third Day of December, 2008

JON W. DUDAS
*Director of the United States Patent and Trademark Office*